Patented Dec. 10, 1946

2,412,272

UNITED STATES PATENT OFFICE 2,412,272

ACYL DERIVATIVES OF VITAMIN B6

John C. Keresztesy, Westfield, and Joseph R. Stevens, Rahway, N. J., assignors to Merck & Co., Inc., Rahway, N. J., a corporation of New Jersey No Drawing. Original application April 30, 1940, Serial No. 332,452. Divided and this application December 11, 1942, Serial No. 468,688

4 Claims. (Cl. 260—295)

The present invention relates to a physiologically active chemical compound derived from vitamin $B_6$ and heretofore unknown as a chemical entity. This application is a division of our copending application Serial No. 332,452, filed April 30, 1940, which in turn is a division of our earlier application Serial No. 183,138, filed January 3, 1938, now matured into Patent No. 2,287,042, issued June 23, 1942.

We have discovered that certain physiologically active chemical compounds can be obtained by treating materials containing the water soluble vitamin $B_6$, either in free or in combined state as it is found naturally, which possess the unexpected but inherent property of being soluble in fats and oils and fat solvents as, for instance, chloroform, ether, etc., thus making possible the production of solutions containing a substance having the physiological properties of vitamin $B_6$ and a fat-soluble vitamin as, for instance, vitamins A or D in the same solvent. Another valuable inherent property of these oil soluble vitamin $B_6$ derivatives is that they can be readily purified by sublimation in vacuo.

We have found that a suitable raw material for use in preparing these oil-soluble derivatives of vitamin $B_6$ can be obtained by extracting rice bran with acidulated water, adsorbing the active principle on fuller's earth, eluting and treating the eluate with an acylating agent. Of course, it is possible to prepare a suitable vitamin $B_6$ concentrate by other methods obvious to those skilled in the art, or pure synthetic vitamin $B_6$ itself can be used.

In preparing these new substances, an initial step can consist of treating an appropriate concentrate, of the kind heretofore described, with acid and with alkali to cause removal from, and chemical modification of, some of the inactive or foreign materials present. By inactive or foreign material is meant substances which are inactive per se or which possess a different physiological activity from vitamin $B_6$, such as vitamin $B_1$, nicotinic acid, lactoflavin, and other principles.

A modified procedure can include the removal of the inactive and/or chemically altered materials by extraction with appropriate solvents and subsequent separation of our physiologically active materials from these other inactive materials.

The final step consists of acylation of the vitamin-containing material and the subsequent separation of the desired acylated vitamin principle from foreign and other inactive or altered material, for example, by extraction with chloroform.

If the active principle is to be isolated from extracts derived from natural products other than rice bran, the steps above outlined can be modified or supplemented by the precipitation of inactive material with ethyl nitrite and/or by a destruction by oxidation with mild oxidizing agents such as 10% nitric acid.

By way of more specific illustration of the methods for producing the new substances, certain procedures of the type preferred above broadly outlined, will now be described.

A. Elimination of inactive or foreign materials by acid

We have found that a large amount of inactive material can be removed by means of an acid treatment, because insoluble compounds are formed which can be filtered off and/or simple hydrolysis products are produced, which differ from their parent substances in their solubility, so that they can be removed by means of selective solvents in subsequent steps. Examples of preferred methods of practicing this step are presented by way of illustration:

About 500 grams of a vitamin-containing concentrate are dissolved in water to form about two liters of solution and 800 cc. of concentrated hydrochloric acid are added. This mixture (containing approximately 10% HCl) is allowed to digest on a steam bath for sixteen hours, then is cooled and the insoluble material removed by filtration. The solution is neutralized with 30% sodium hydroxide and the resulting mixture concentrated under vacuum to a syrupy mass which is then exhaustively extracted with 95% ethyl alcohol. The alcohol extract is evaporated in vacuo to a syrup free from alcohol. By this treatment no significant loss of the active principle, vitamin $B_6$, occurs, whereas a substantial decrease in the foreign organic materials present is effected. If desired, concentrated hydrochloric acid can be substituted for the 10% acid and the resulting mixture can be digested at 100° C. or can be boiled under reflux with no significant destruction of the active substance.

B. Elimination of inactive and foreign material by alkali

We have found also that many undesirable substances present in the concentrate can be removed by alkaline treatment without significant loss of vitamin $B_6$. According to this method of treatment, the product obtained from process A is diluted with water and sufficient 30% sodium hydroxide is added to produce a solution containing 10% sodium hydroxide. This solution is then digested on a steam bath for about sixteen hours at 100° C. then is cooled and filtered, neutralized with hydrochloric acid and evaporated in vacuo to a syrup. This syrup is exhaustively extracted with 95% alcohol and the extract evaporated to a syrup free of alcohol.

By this treatment some inert materials are removed and also other inactive materials converted into substances whose properties differ sufficiently from those of parent substances, so that they may be more easily removed in subsequent processes. In place of sodium hydroxide, other alkalis can be used, such as potassium, calcium, barium, or strontium, hydroxides.

C. Selective separation by means of solvents

We have found that an appreciable concentration of the vitaminic substance can be effected by the use of certain solvents. According to this procedure the syrup obtained from step B is further concentrated to a thick gum in vacuo until it is practically free of water. This residue is then thoroughly extracted with hot absolute alcohol and the alcoholic solution, on cooling deposits insoluble inactive material which is removed by filtration. The alcoholic extract is then evaporated to dryness on sand under high vacuum with mild heating. The dried preparation is then subjected to a series of exhaustive solvent extractions with several volumes of the solvent until further extractions do not remove significant quantities of soluble materials. The solvents used are ethyl ether, chloroform and acetone, preferably used successively in this order. Biological assay of the resulting fractions indicates that the vitamin has been largely concentrated into the acetone extract with a substantial reduction of the inert or inactive organic materials originally present. In place of sand it is possible to use other adsorbent materials, such as powdered glass, asbestos and other inactive materials, which will not form an adsorption complex with the active principle, while permitting the distribution of the material to be extracted on a large surface.

The acetone extract can be further purified by redrying on sand under high vacuum, as before mentioned, and again subjecting the material to repeated extractions with ether, cholorform and acetone.

D. Preparation of acylated vitamin

We have found that under special conditions vitamin $B_6$ can be converted to an acylated form in good yield which possesses the physiological characteristics of the vitamin and which, as mentioned, is valuable because of its solubility in oils, fats, and fat solvents. The vitamin $B_6$, as well as most of the impurities, are sparingly soluble in chloroform. We have found, however, that acylated vitamin $B_6$ is easily extractable from aqueous solution with chloroform even in the presence of dilute acid. This difference in solubility makes it possible to remove a large amount of foreign bodies. Our preferred method is to mix the water-free extract obtained under "C," containing small amounts of alcohol, with acetyl chloride at room temperature, refluxing gently and, after cooling, treating the reaction mixture with ice water, extracting the acylated vitamin with chloroform, and recovering the product by evaporating the chloroform. In this process acetyl chloride can be replaced by acetic anhydride or by the chlorides or anhydrides of other lower aliphatic organic acids. The method of acylation will depend upon the acylating agent, solvent, etc.; such variations in procedure are well known to those skilled in the art.

The product thus obtained is therapeutically pure and can be used directly or further purified if desired for special purposes.

The examples of the several steps as herein set forth are presented by way of illustration to enable those skilled in the art to practice the same by appropriate adaptation to various source materials, and the invention is not intended to be limited to specific steps so exemplified.

Obviously the number and order of the steps, and solvents and materials employed, may be modified, within reasonable limits, in the practice of the invention as disclosed, without departing from the spirit and scope thereof.

What is claimed is:

1. Fat soluble vitamin $B_6$ preparations essentially consisting of therapeutically pure acetyl derivatives of vitamin $B_6$ concentrates.

2. Fat-soluble vitamin $B_6$ preparations essentially consisting of therapeutically pure acetyl derivatives of vitamin $B_6$ in substantially pure form.

3. Fat-soluble vitamin $B_6$ preparations essentially consisting of therapeutically pure acyl derivatives of vitamin $B_6$ in substantially pure form, the acid radicles contained in said preparations being the acyl radicles of the lower molecular saturated aliphatic acids.

4. Fat-soluble vitamin $B_6$ preparations essentially consisting of therapeutically pure acyl derivatives of vitamin $B_6$ concentrates, the acyl radicles contained in said preparations being the acyl radicles of the lower molecular saturated aliphatic acids.

JOHN C. KERESZTESY.
JOSEPH R. STEVENS.